United States Patent
Lee et al.

(10) Patent No.: US 8,949,610 B2
(45) Date of Patent: Feb. 3, 2015

(54) METHOD FOR EMBEDDING SECRET MESSAGE INTO PNG IMAGE

(75) Inventors: Che Wei Lee, Kaohsiung (TW); Wen-Hsiang Tsai, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 537 days.

(21) Appl. No.: 13/033,384

(22) Filed: Feb. 23, 2011

(65) Prior Publication Data

US 2011/0249813 A1 Oct. 13, 2011

(30) Foreign Application Priority Data

Apr. 13, 2010 (TW) .............................. 99111410 A

(51) Int. Cl.
| | |
|---|---|
| H04L 9/32 | (2006.01) |
| H04N 1/32 | (2006.01) |
| G06T 1/00 | (2006.01) |
| H04L 9/08 | (2006.01) |
| G06K 9/36 | (2006.01) |
| G06K 9/20 | (2006.01) |

(52) U.S. Cl.
CPC .......... *H04N 1/32128* (2013.01); *G06T 1/0021* (2013.01); *G06T 1/0028* (2013.01); *H04L 9/085* (2013.01); *G06T 2200/28* (2013.01); *H04L 2209/16* (2013.01); *H04N 2201/327* (2013.01)
USPC .............................. 713/176; 382/276; 382/282

(58) Field of Classification Search
CPC ... H04L 9/085; H04L 2209/16; G06T 1/0021; G06T 1/0028; G06T 2200/28; H04N 1/32128; H04N 2201/327
USPC .................................. 713/176; 382/282, 276
See application file for complete search history.

(56) References Cited

U.S. PATENT DOCUMENTS

| | | | |
|---|---|---|---|
| 6,557,103 B1 | 4/2003 | Boncelet, Jr. et al. | |
| 7,035,700 B2 | 4/2006 | Gopalan et al. | |
| 7,751,584 B2 | 7/2010 | Zimmer et al. | |
| 2003/0026447 A1* | 2/2003 | Fridrich et al. | 382/100 |
| 2003/0081809 A1* | 5/2003 | Fridrich et al. | 382/100 |
| 2003/0131237 A1* | 7/2003 | Ameline et al. | 713/176 |
| 2010/0115282 A1* | 5/2010 | Amsterdam et al. | 713/176 |

FOREIGN PATENT DOCUMENTS

| | | |
|---|---|---|
| TW | 201025225 A1 | 7/2010 |
| TW | 468337 B | 2/2011 |

* cited by examiner

*Primary Examiner* — Evans Desrosiers
*Assistant Examiner* — Lawrence Cosby
(74) *Attorney, Agent, or Firm* — Rosenberg, Klein & Lee

(57) ABSTRACT

A method for embedding a secret message into a PNG image comprises steps: converting a secret message into a plurality of secret codes; converting the secret codes into a plurality of secret shares; using a mapping process to modify values of the secret shares to approach a full-transparent value of an alpha channel of a PNG image, and sequentially embedding the mapped secret shares into the alpha channel. As the secret shares with high-transparent values, they leave the RGB channels untouched. Thus, embedding the secret shares into the PNG image does not make difference in the appearances between the secret-carrying image and the original PNG image. Therefore, the present invention can transmit secret message securely and realize covert communication.

5 Claims, 6 Drawing Sheets though encryption can increase security of information transmission, encrypted data is similar to random code and likely to be recognized and depredated. Therefore, there is a steganographic technology, which increases information security via hiding secret information into a cover file to yield a stego-file. The stego-file is transmitted to the recipient, and the recipient decrypts the stego-file to retrieve the secret information. The steganographic technology can greatly reduce the probability of arousing suspicion. The information hidden in a cover file is less likely to be recognized than encrypted information.

METHOD FOR EMBEDDING SECRET MESSAGE INTO PNG IMAGE

BACKGROUND OF THE INVENTION

1. Field of the Invention

The present invention relates to an image processing technology, particularly to a technology of embedding a secret message into a PNG (Portable Network Graphics) image.

2. Description of the Related Art

In the age of network, various communications are highly involved with the Internet. And so, various files, such as text, voices and images, are transmitted via networks.

However, network communication lacks sufficient security. Thus, secret information is encrypted before transmission, and the recipient decrypts the encrypted information to obtain the original information. Although encryption can increase security of information transmission, encrypted data is similar to random code and likely to be recognized and depredated. Therefore, there is a steganographic technology, which increases information security via hiding secret information into a cover file to yield a stego-file. The stego-file is transmitted to the recipient, and the recipient decrypts the stego-file to retrieve the secret information. The steganographic technology can greatly reduce the probability of arousing suspicion. The information hidden in a cover file is less likely to be recognized than encrypted information.

A U.S. patent No. 20067035700 disclosed a technology to hide a secret message into an audio file, wherein the secret message is embedded in the audio file via varying the magnitude of the power spectrum at perceptual holes. However, such a technology results in distortion to the original audio content. A U.S. patent No. 20036557103 disclosed a technology using an image file to carry a secret message, wherein the secret message is encoded with an error correcting code and then embedded into images according to a random sequence generated by a key. However, such a technology can only hide a limited amount of secret information. A U.S. patent No. 20107751548 disclosed a technology hiding secret messages in firmware images. However, firmware images are less likely to obtain. A Taiwan patent No. 468337 disclosed a technology using interleaving, convolutional encoding and the relationship of the surrounding pixels to hide secret messages. A Taiwan patent No. 201025225 disclosed a technology, which compresses secret messages and directly embeds the compressed data into host images. However, the abovementioned two prior arts cause distortion to host images more or less.

After reviewing the abovementioned conventional steganographic technologies, the Inventors integrate the secret sharing technique with the alpha channel supported by the image format of PNG to develop a method for embedding a secret message into PNG images.

SUMMARY OF THE INVENTION

The primary objective of the present invention is to provide a method for embedding a secret message into a PNG image, which converts a secret message into secret shares and embeds the secret shares into the alpha channel of a PNG image, whereby the secret message is hidden in the PNG image and transmitted together with the PNG image.

Another objective of the present invention is to provide a method to embed a secret message into a PNG image, which embeds a secret message into a PNG image, neither distorting the contents of the PNG image nor changing the values of the RGB channels of the PNG image.

A further objective of the present invention is to provide a method to embed a secret message into a PNG image, which has superior decoding efficiency and can easily restore the secret message hidden in PNG image.

To achieve the abovementioned objectives, the present invention proposes a method for embedding a secret message into a PNG image, which comprises steps: converting a secret message into a plurality of secret codes; using the secret codes as coefficients to form simultaneous equations; substituting different values into different variables of the simultaneous equations to obtain several resultant values; dividing the resulting values with an initial reference value to obtain several remainders functioning as secret shares; modifying the secret shares into a certain range of values, which approach full-transparent values of the alpha channel in a PNG image; embedding the modified values, representing high transparency, into the alpha channel of the PNG image, wherein the values of the alpha channel of the PNG image range from 0 to 255, and 0 denotes "white" or "opaque" and 255 denotes "full transparency".

Below, the embodiments are described in detail in cooperation with drawings and equations to make easily understood the objectives, technical contents, characteristics and accomplishments of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4(*b*) shows the same image in FIG. 4(*a*) after the secret message is embedded according to one embodiment of the present invention.

DETAILED DESCRIPTION OF THE INVENTION

The present invention proposes a method for embedding a secret message into a PNG (Portable Network Graphics) image, which realizes high-security covert communication via hiding a secret message into a PNG image and transmitting the secret message together with the PNG image, neither distorting the content of the PNG image nor changing the RGB channels of the PNG image. Below, the embodiments are described in detail to demonstrate the technical contents of the present invention.

Figure 1:
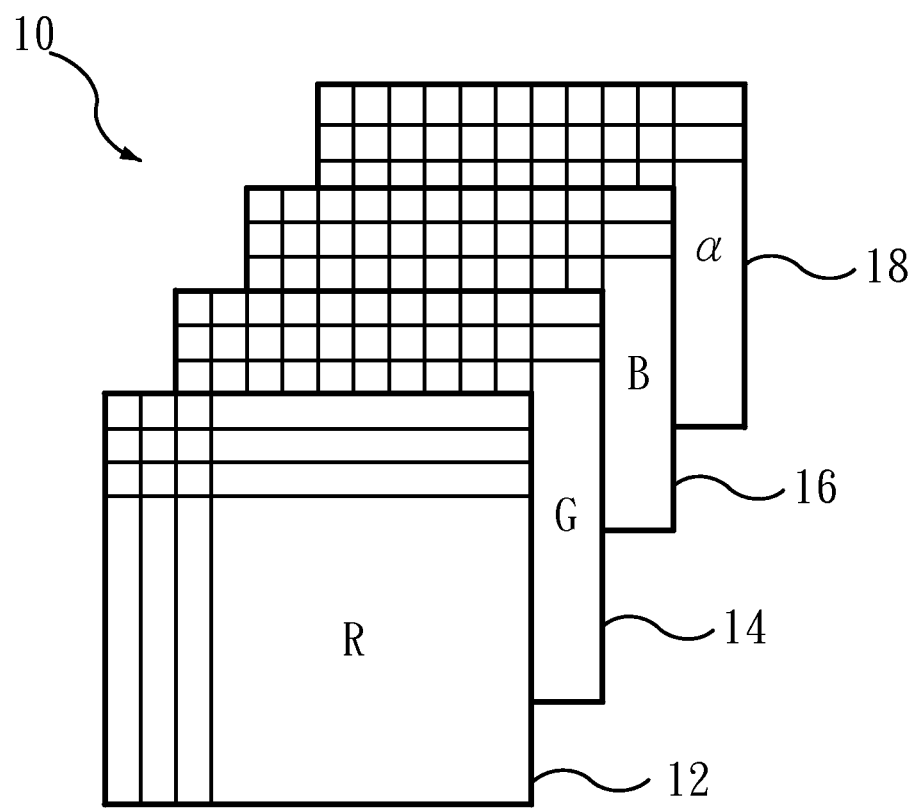
FIG. 1 is an exploded view schematically showing the format of a PNG image according to one embodiment of the present invention.

Refer to FIG. 1 an exploded view schematically showing the format of a PNG image according to one embodiment of the present invention. A PNG image 10 has four channels: an R (Red) channel 12, a G (Green) channel 14, a B (Blue) channel 16, and a transparency (alpha, a) channel 18. The color channels R (Red) channel 12, G (Green) channel 14 and B (Blue) channel 16 respectively contain corresponding color values. The color value ranges from 0 to 255 of the decimal system. The transparency of the alpha channel 18 is also expressed by 0-255 of the decimal system, wherein 0 denotes "white" or "opaque" and 255 denotes "full transparent". Below is described in detail the process of embedding a secret message into a PNG image.

Figure 2:
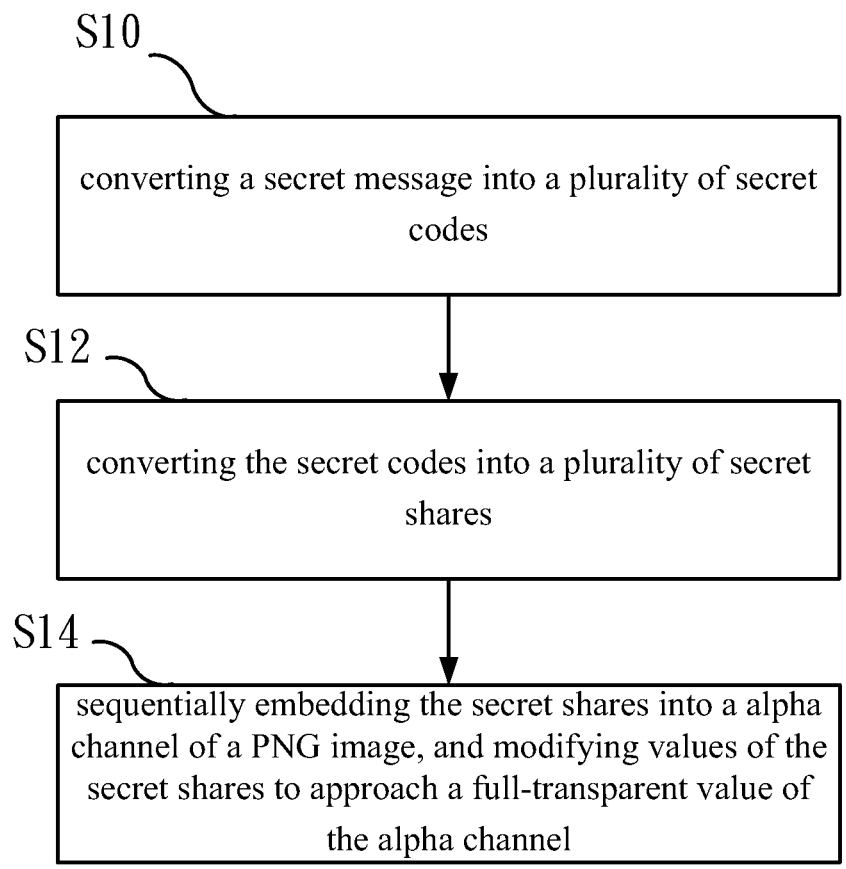
FIG. 2 is a flowchart of the process of embedding a secret message into a PNG image according to one embodiment of the present invention.
Figure 3:
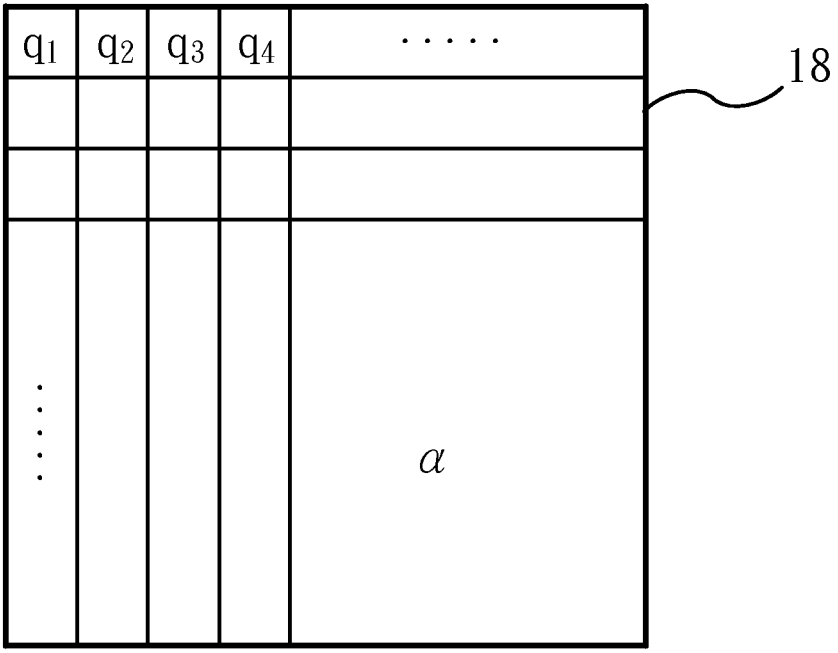
FIG. 3 is a diagram schematically showing that secret shares are embedded into an alpha channel according to one embodiment of the present invention.

Refer to FIG. 2 a flowchart of the process of embedding a secret message into a PNG image according to one embodiment of the present invention. Refer to FIG. 3 a diagram schematically showing that secret shares are embedded into an alpha channel according to one embodiment of the present invention. In Step S10, convert a secret message into a plurality of secret codes. In this embodiment, the secret message is converted into a binary string firstly. Next, sequentially take a specified number of bits from the binary string to form a plurality of bytes. Each byte is converted into a decimal numeral to function as a secret code. For example, convert a secret message into a binary string 100011010111; sequentially take each three bits as a byte from left to right to form a plurality of bytes 100, 011, 010 and 111. Next, convert the bytes into decimal numerals, i.e. 4(100), 3(011), 2(010), and 7(111). Thus, the binary string is converted into four secret codes $\{4, 3, 2, 7\}$.

In Step S12, convert the secret codes into a plurality of secret shares according to Equation (1):

$$\begin{cases} q_1 = F(x_1) = (m_0 + m_1 x_1 + m_2 x_1^2 + m_3 x_1^3)_{mod\,p} \\ q_2 = F(x_2) = (m_0 + m_1 x_2 + m_2 x_2^2 + m_3 x_2^3)_{mod\,p} \\ q_3 = F(x_3) = (m_0 + m_1 x_3 + m_2 x_3^2 + m_3 x_3^3)_{mod\,p} \\ q_4 = F(x_4) = (m_0 + m_1 x_4 + m_2 x_4^2 + m_3 x_4^3)_{mod\,p} \end{cases} \quad (1)$$

wherein the secret codes are used as the coefficients $m_0$, $m_1$, $m_2$ and $m_3$, and wherein $q_1$, $q_2$, $q_3$ and $q_4$ are the secret shares to be embedded into the alpha channel 18, and wherein $x_1$, $x_2$, $x_3$ and $x_4$ respectively denote four variables, and wherein the values of the variables can be assigned by the user, and wherein the values of the variables should be smaller than p.

Equation (1) is a group of cubic simultaneous equations, wherein each equation thereof is divided by an initial reference value p to obtain the remainder. The initial reference value p must be a prime number. As the alpha channel 18 has a minimum of 0 and a maximum of 225, the initial reference value p should be within the range of 0-225. Further, the initial reference value p should be greater than the coefficients $m_0$, $m_1$, $m_2$ and $m_3$.

As mentioned above, the secret message 100011010111 is partitioned by each three bits and converted into four secret codes $\{4, 3, 2, 7\}$. Therefore, $m_0=4$, $m_1=3$, $m_2=2$, and $m_3=7$. As mentioned above, the initial reference value p should be greater than $m_0$, $m_1$, $m_2$ and $m_3$. Therefore, the initial reference value p should be a prime number greater than 7 and closest to 7. Therefore, the number 11 is selected as the initial reference value p. Suppose that $x_1=1$, $x_2=2$, $x_3=3$, $x_4=4$. Thus, $q_1=5$, $q_2=8$, $q_3=0$, $q_4=1$.

In Step S14, sequentially embed the secret shares into the alpha channel 18 of the PNG image, and modify the values of the secret shares into the range of values approaching the full-transparent value (255). The process is called the mapping process.

As mentioned above, the initial reference value p is 11, and the secret shares $\{q_1, q_2, q_3, q_4\}=\{5, 8, 0, 1\}$, which are within the range of 0-10 and approaches the values of white or opacity. In order to make the values of the secret shares approach the full-transparent value, the value 245 is added to all the secret shares. Thus, the secret shares $\{q_1, q_2, q_3, q_4\}$ become $\{250, 253, 245, 246\}$. Even if a secret share has a value of 10, 245 plus the value of the secret share is still not greater than the maximum value of the alpha channel 18-255. After mapping the secret shares, the values of the secret shares range from 245 to 255 and all approach the full-transparent value.

The process of embedding a secret message into a PNG image 10 has been described above. The embedded secret message can be restored according to Equation (2):

$$F(x) = \left[ F(x_1) \frac{(x-x_2)(x-x_3)\ldots(x-x_k)}{(x_1-x_2)(x_1-x_3)\ldots(x_1-x_k)} + \right. \\ F(x_2) \frac{(x-x_1)(x-x_2)\ldots(x-x_k)}{(x_2-x_1)(x_2-x_3)\ldots(x_2-x_k)} + \ldots + \\ \left. F(x_k) \frac{(x-x_1)(x-x_2)\ldots(x-x_{k-1})}{(x_k-x_1)(x_k-x_2)\ldots(x_k-x_{k-1})} \right] \quad (2)$$

When k=4, $F(x_1)$ to $F(x_k)$ in Equation (2) are corresponding to $F(x_1)$ to $F(x_4)$ in Equation (1), and $x_1$, $x_2$, $x_3$ ... $x_k$ in Equation (2) are corresponding to $x_1$-$x_4$ the variables in Equation (1), whose values are assigned by a user. In the process of decoding the secret message embedded in the PNG image 10, subtract 245 from the values of mapped secret shares $\{q_1, q_2, q_3, q_4\}$ to obtain the values of unmapped secret shares $\{q_1, q_2, q_3, q_4\}$ firstly. The values of $x_1$-$x_4$ are assigned by the user and should be known to the intended recipient. The recipient substitutes the values of the four secret shares $\{q_1, q_2, q_3, q_4\}$ and the values of $x_1$-$x_4$ into Equation (2) to obtain the coefficients of $F(x)=4+3x+2x^2+7x^3$, wherein 4, 3, 2, and 7 are the coefficients ($m_0$, $m_1$, $m_2$ and $m_3$) of the terms in the equation. Next, convert the decimal numerals of $m_0$, $m_1$, $m_2$ and $m_3$ into binary values, i.e. $m_0=(4)_{10}=(100)_2$, $m_1=(3)_{10}=(011)_2$, $m_2=(2)_{10}=(010)_2$, $m_3=(7)_{10}=(111)_2$. Next, sequentially cascade the binary values to obtain the original secret message (100011010111).

Summarily, the present invention converts a secret message into secret shares; the secret shares are processed by value mapping and embedded into the alpha channel 18 of the PNG image 10; the recipient extracts and decodes the embedded secret message to obtain the original content of the secret message. The present invention further provides a general formula tS to calculate the quantity of the secret data that can be embedded in the PNG image the data hiding capacity (DHC), wherein t denotes the number of bits by which the binary string is partitioned into secret codes, and wherein S denotes the size of the PNG image 10. Suppose that the PNG image 10 has a size of 512×512. If the binary string of a secret message is partitioned into secret codes by each three bits, t=3. Thus, the maximum quantity of the secret data that can be embedded into the PNG image is tS=3×512×512. If the binary string of a secret message is partitioned into secret codes by each four bits, t=4. Thus, the maximum quantity of the secret data that can be embedded into the PNG image is 4S. The higher the quantity of the embedded secret data is, the greater the degree of image quality degradation caused by uneven transparency becomes. The value of t should be chosen considering the size of the secret data.

Figure 4A:
FIG. 4(*a*) shows an image before a secret message is embedded according to one embodiment of the present invention.
Figure 4B:
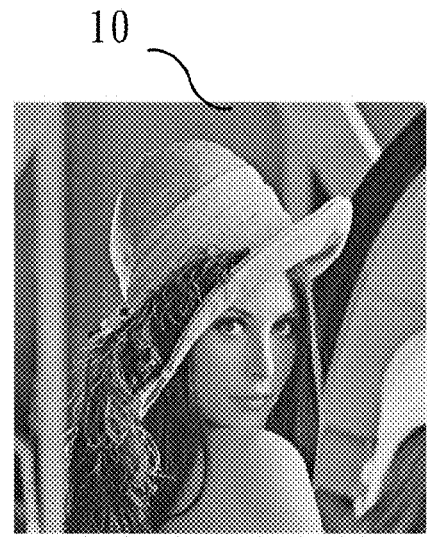
Figure 5A:
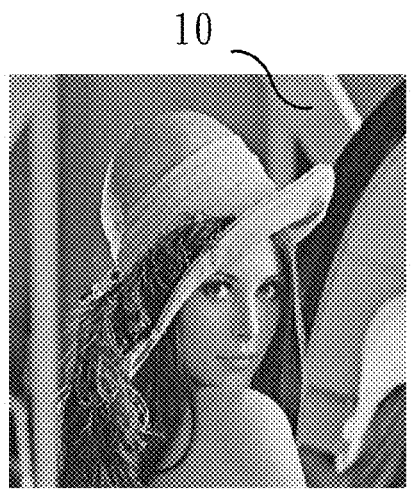
FIGS. 5(*a*)-5(*g*) respectively show images containing a secret message whose binary string is partitioned by different values of t according to one embodiment of the present invention.
Figure 5B:
Figure 5C:
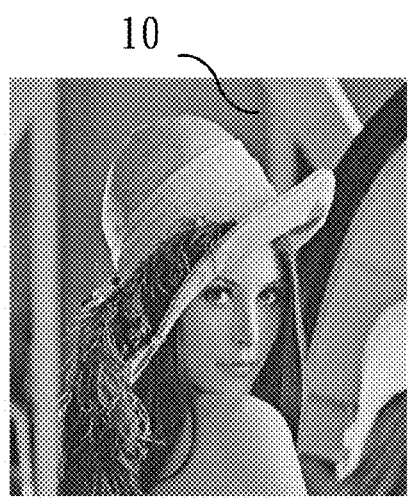
Figure 5D:
Figure 5E:
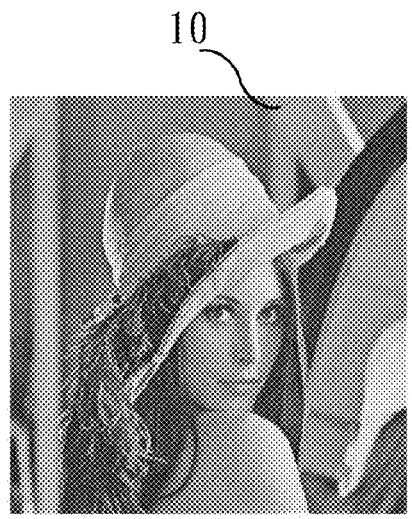
Figure 5F:
Figure 5G:

Refer to FIG. 4(a) and FIG. 4(b) respectively showing the images before and after the secret message is embedded. Refer to Table (1) also. Embedding the secret message does not make any distortion to the original PNG image so that the appearance of the stego-image generated by our method seems to be the same as its original version. Therefore, the PNG image 10 can provide good concealment for the secret message. Table (1) lists DHC (Data Hiding Capacity) and PSNR (Peak of Signal-to-Noise Ratio) for t values of 1-7. Refer to FIGS. 5(*a*)-5(*g*) also. From Table (1), it is can be seen that DHC increases with t—the number of bits by which the binary string is partitioned, and the unevenness of the alpha channel increases with DHC. Thus, the quality of the PNG image 10 decreases with increasing DHC. It is observed in FIGS. 5(*a*)-5(*g*) that the quality of the PNG image 10 decreases with the increase of t from 1 to 7.

TABLE (1)

| | PNG Image | |
| --- | --- | --- |
| t value | Data Hiding Capacity (DHC) (bits) | Peak of Signal-to-Noise Ratio (PSNR) in the α Channel (dB) |
| t = 1 | 262144 | 45.44 |
| t = 2 | 524,288 | 39.77 |
| t = 3 | 786,432 | 32.69 |
| t = 4 | 1,048,576 | 28.68 |
| t = 5 | 1,310,720 | 21.72 |
| t = 6 | 1,572,864 | 16.74 |
| t = 7 | 1,835,008 | 10.61 |

The embodiments described above are only for demonstrating the technical thoughts and characteristics of the present invention to enable the persons skilled in the art to understand, make, and use the present invention. However, it is not intended to limit the scope of the present invention. Any equivalent modification or variation according to the spirit of the present invention is to be also included within the scope of the present invention.

What is claimed is:

1. A method for embedding a secret message into a portable network graphics image in a computer readable medium comprising steps of:

executing a processor to separate the portable network graphics image into a red channel, a green channel, a blue channel, and an alpha channel, the alpha channel defining a transparency channel;

wherein values of said alpha channel range from 0 to 255 of a decimal system, and wherein said "0" denotes "opaque" and said "255" denotes "full transparency";

converting a secret message into a plurality of secret codes; converting said secret codes into a plurality of secret shares;

wherein said secret shares are expressed by simultaneous equations containing said secret codes;

sequentially embedding said secret shares representing the encoded secret message into the alpha channel of the portable network graphics image to define a modified alpha channel;

modifying values of said secret shares as a function of a user predetermined value, said predetermined value selectively chosen to make transform each of the values of said secret shares from a first transparency value to a second transparency value to approach a full-transparent value of said alpha channel; and recomposing the red channel, the green channel, the blue channel and the modified alpha channel to define a secret embedded portable network graphics image; wherein the portable network graphics image and the secret embedded portable network graphics image are visually substantially similar.

2. The method for embedding a secret message into a portable network graphics image according to claim 1, wherein each equation of said simultaneous equations is divided by an initial reference value to obtain a remainder.

3. The method for embedding a secret message into a portable network graphics image according to claim 2, wherein said initial reference value is a prime number within said values of said alpha channel ranging from 0 to 255 of a decimal system.

4. The method for embedding a secret message into a portable network graphics image according to claim 1, wherein said values of said secret shares are modified to approach said full-transparent value of said alpha channel via adding an identical value to all said secret shares when said secret shares are sequentially embedded into said alpha channel of said portable network graphics image.

5. The method for embedding a secret message into a portable network graphics image according to claim 1, wherein said secret codes are converted into a plurality of secret shares according to:

$$q_1 = F(x_1) = (m_0 + m_1 x_1 + m_2 x_1^2 + m_3 x_1^3) \bmod p$$

$$q_2 = F(x_2) = (m_0 + m_1 x_2 + m_2 x_2^2 + m_3 x_2^3) \bmod p$$

$$q_3 = F(x_3) = (m_0 + m_1 x_3 + m_2 x_3^2 + m_3 x_3^3) \bmod p$$

$$q_4 = F(x_4) = (m_0 + m_1 x_4 + m_2 x_4^2 + m_3 x_3^4) \bmod p$$

wherein $m_0$, $m_1$, $m_2$ and $m_3$ respectively denote each of said secret codes; $q_1$, $q_2$, $q_3$, and $q_4$ respectively denote each of said secret shares; an initial reference value p denotes a prime number larger than $m_0$, $m_1$, $m_2$ and $m_3$; and $x_0$, $x_1$, $x_2$ and $x_3$ respectively denote four variables smaller than said initial reference value.

* * * * *